(12) United States Patent
Falk

(10) Patent No.: US 8,463,042 B2
(45) Date of Patent: Jun. 11, 2013

(54) METHOD AND APPARATUS FOR PATTERN PROCESSING

(76) Inventor: Eberhard Falk, Hagen (DE)

(*) Notice: Subject to any disclaimer, the term of this patent is extended or adjusted under 35 U.S.C. 154(b) by 993 days.

(21) Appl. No.: 12/471,047

(22) Filed: May 22, 2009

(65) Prior Publication Data

US 2010/0067795 A1 Mar. 18, 2010

(30) Foreign Application Priority Data

May 27, 2008 (EP) .................................... 08156986

(51) Int. Cl.
*G06K 9/62* (2006.01)
*G06K 9/18* (2006.01)
*G06K 9/46* (2006.01)
*G06K 9/36* (2006.01)
*G06E 1/00* (2006.01)

(52) U.S. Cl.
USPC ........... 382/182; 382/161; 382/190; 382/209; 382/276; 706/20

(58) Field of Classification Search
USPC ............. 382/182, 161, 190, 209, 276; 706/20
See application file for complete search history.

(56) References Cited

U.S. PATENT DOCUMENTS

| | | | | |
|---|---|---|---|---|
| 5,422,961 A | * | 6/1995 | Simard | ........................ 382/224 |
| 5,864,635 A | * | 1/1999 | Zetts et al. | ..................... 382/187 |
| 6,081,620 A | | 6/2000 | Anderholm | |
| 6,295,367 B1 | | 9/2001 | Crabtree et al. | |
| 2005/0018906 A1 | * | 1/2005 | Napper | ......................... 382/186 |
| 2006/0008151 A1 | * | 1/2006 | Lin et al. | ....................... 382/190 |

OTHER PUBLICATIONS

European Search Report for Application No. 08156986.5, dated Oct. 31, 2008, 3 pages.
Ishii, Kenichiro, "Design of a Recognition Dictionary Using Artificially Distorted Characters", Systems and Computers in Japan, vol. 21, No. 9, 1990, pp. 35-44.

* cited by examiner

*Primary Examiner* — Kathleen Y Dulaney
(74) *Attorney, Agent, or Firm* — Marger Johnson & McCollom PC

(57) ABSTRACT

An apparatus for pattern processing exhibits a discretizing device for discretizing an input pattern, a device for generating a number n of discrete variants of the quantized input pattern in accordance with established rules, a number n of input stages (50) for generating, for each input-pattern variant, an assigned output symbol from a set of symbols, and a selection unit (60) for selecting a symbol by way of selected symbol relating to the input pattern from the n generated output symbols in accordance with an established selection rule. The apparatus according to the invention and the corresponding process according to the invention enable a faster, more precise and more flexible recognition of patterns, in which connection it may be a question of spatial image patterns, temporally variable signal patterns and other input patterns.

18 Claims, 12 Drawing Sheets

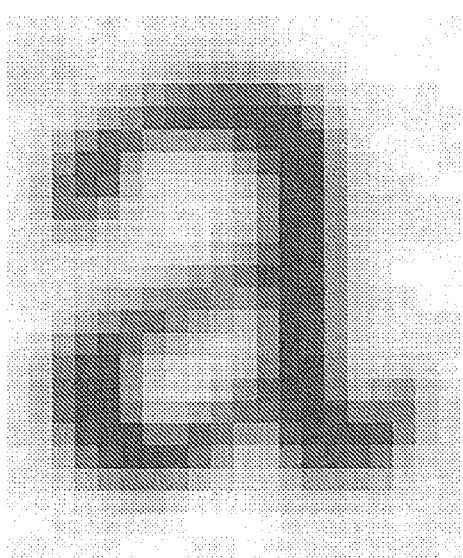
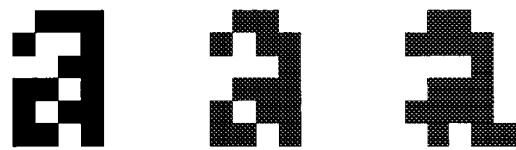
Fig. 6

There was a book lying near Alice on the table, and while she sat watching the White King (for she was still a little anxious about him, and had the ink all ready to throw over him, in case he fainted again), she turned over the leaves, to find some part that she could read, "—for it's all in some language I don't know," she said to herself.

It was like this.

JABBERWOCKY

'Twas brillig, and the slithy toves
Did gyre and gimble in the wabe:
All mimsy were the borogoves,
And the mome raths outgrabe.

She puzzled over this for some time, but at last a bright thought struck her. "Why, it's a Looking-glass book, of course! And, if I hold it up to a glass, the words will all go the right way again."

This was the poem that Alice read

JABBERWOCKY

'Twas brillig, and the slithy toves
Did gyre and gimble in the wabe:
All mimsy were the borogoves,
And the mome raths outgrabe.

Fig. 11

She puzzled over this for some time, but at last a bright thought struck her. "Why, it's a Looking-glass book, of course! And, if I hold it up to a glass, the words will all go the right way again."

This was the poem that Alice read

JABBERWOCKY

'Twas brillig, and the slithy toves
    Did gyre and gimble in the wabe.
All mimsy were the borogoves,
    And the mome raths outgrabe.

Fig. 12

METHOD AND APPARATUS FOR PATTERN PROCESSING

FIELD OF THE INVENTION

The invention relates to a process and to an apparatus for pattern processing.

STATE OF THE ART

Already numerous processes for pattern processing and pattern recognition are known nowadays. One disadvantage of the known processes, however, consists in the fact that in each instance they can only be used for special types of pattern. The general applicability of these known processes is consequently greatly limited.

In addition, in some step or other all the known processes introduce stochastic methods (for example, hidden Markov models—HMMs) or a metric structure (neuromanifolds or Kohonen maps).

Through the use of very complex computational algorithms, prior processes are very elaborate and, as a result, require enormous computing capacity. In addition, they often attempt to prevent diversity by normalisation and standardisation at the input, in order to alleviate the work for the following classifier. A known process of such a type for pattern recognition is represented schematically in FIG. 1. Characteristic features in the input signal to be recognised are registered by an analyzer, and said features are subsequently assigned to a particular symbol class by means of a classifier.

The disclosed invention arose in the study of a phenomenon called hyperacuity. The retinal image of a point source of light has a diameter of about five arc minutes, but apparent resolution is about five times better. Human vision can achieve recognition with incredibly small images. A scanned page from a book will illustrate this capability.

Referring to FIG. 11, the resolution on top is about 300 dpi, and it falls gradually towards the bottom. The text remains legible although the individual letters occupy only a few pixel cells. The second image (shown in FIG. 12) has been converted to black and white by a simple threshold operation. Upon close examination the letters at the bottom look like undecipherable pixel soup. From a larger distance, however, and with the aid of some squinting, the letters suddenly become recognizable. These phenomena are in no way limited to vision. They occur in auditory and semantic processing, too. When listening to speech, the brain can extract fine spectral detail along with fine temporal detail. We can understand the speaker's mind; extract precise meaning from fuzzy words and concepts.

 A classifier is a function from a large, potentially infinite topological space X into a finite, discrete set Y. In an OCR system, X may be the set of all grayscale images of size 17×20 with 256 gray levels.

A reference example is just a point of X with prescribed image in Y. For a reasonable example, the classifier should be constant on a small neighborhood of x, f(x) should not change if x moves a little. In the terminology of sheaves of functions on the space X, a reference example is a "germ of a function". Any learning algorithm must grow these germs, extend them to functions on larger open subsets, large enough to be useful. A nearest neighbor classifier, for example, takes a metric on X and extends f to balls around the reference examples. By contrast, the method presented here re-constructs the space X from local data alone and does not assume a global embedding.

The a-ness of the image survives under a wide range of linear or nonlinear transformations. There are large families of such transformations.

The 16 images below, for example, arise from the original by cropping away rows or columns of pixels adjacent to the top, left, right and bottom of the image.

aaaaaaa aaaaa aaa

When scaled down to 6×5 pixels, they appear very similar.

The threshold operation (with the median gray value as threshold) amplifies small differences and separates images that were almost identical.

There are only $1.55*10^8$ possible images at this resolution. Most of them are just noise, and only a few thousand of them will give a strong impression of a-ness. A complete table of all good 'a's will reach or even exceed human ability to recognize a-ness.

The commutative diagram to the right describes the situation in a more abstract way. The down arrows $h_i$ are fixed discretization maps (locally constant on dense open subsets) into small, finite spaces $X_i$. In the example above, there are sixteen of them. The $X_i$ are used as address spaces of digital memory units. The functions $f_i: X_i \to Y$ are calculated by memory lookup. Now there are two maps from X to $Y^n$, $f_i \circ h_i$ and $\Delta \circ f$. The diagonal map $\Delta$ maps y to the tuple (y, y, y, y, ... y).

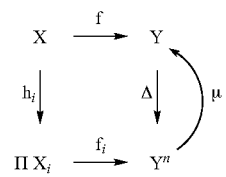

In the example above, all points are mapped to 'a'. The two maps agree and the diagram commutes.

The classifier f may be recovered from the stored memories by a majority decision μ. It maps a point p of $Y^n$ to a point μ(p) that minimizes the Hamming distance of p to the diagonal\Delta\circ\mu.($\Delta \circ \mu$).

The addition of a feedback path that stores the majority decision back into the memory cells addressed by $h_i$ creates a nonautonomous dynamical system. Its state space is the set of sections in the sheaf of continuous functions from X to Y. Such a space has very strange and unfamiliar properties. Despite its apparent simplicity, such a system may exhibit unexpectedly rich behavior.

SUMMARY OF THE INVENTION

Embodiments of the invention improve known processes and apparatuses for pattern recognition, in particular with regard to the accuracy of the pattern recognition and with regard to the flexibility and rapidity of the learning phase.

In contrast to the known pattern-recognition processes, the process according to the invention thrives on diversity and reduces the normalisation and standardisation of the input patterns.

Embodiments of the invention are directed toward a process for pattern processing is proposed, exhibiting the steps of discretization of an input pattern, generation of a number n of discrete variants of the discretized input pattern in accordance with established rules, generation, for each input-pattern variant, of an assigned output symbol from a set of symbols, and selection of a symbol by way of selected symbol relating to the input pattern from the n generated output symbols in accordance with an established selection rule.

The process according to the invention for pattern processing can recognise patterns in real time and with very high accuracy and very low computation effort. In its performance this method clearly surpasses the hidden Markov models (HMMs) which hitherto have been the state of the art for the purpose of pattern processing.

The process can, in addition, solve very effectively problems of VLR-OCR (very-low-resolution OCR, also HMMs) in connection with recognition of really very small typefaces.

The input pattern may be a spatially variable input image. Preferentially the discrete variants of the discretized input pattern are then generated in process step b) in each instance by image-processing operations such as, for example, displacements, rotations, scalings and/or threshold-value operations on the input pattern.

But the input pattern may also be, for example, a temporally variable input signal.

The assignment of the output symbol is preferentially learned in each instance by means of a learning procedure which includes a feedback of the selected symbol as a reference symbol at a symbol input (set).

In this connection, more and more complete maps of the outside world are compiled from a diversity of (where appropriate, time-dependent) symbolic input signals. In their totality these maps bring about a rapid, reliable and robust pattern processing, i.e. a mapping to a selection symbol.

The set of the assigned symbols may include a symbol with the meaning "indeterminate", which specifies that no particular output symbol is assigned to the input pattern.

The established selection rule preferentially includes a majority decision, whereby, for example, a simple majority of the symbols may suffice for determining the selected symbol.

In the majority decision a number of assignments of other symbols (votes against) may also be registered.

In order to make the process very flexible and adaptable, the number n of generated discrete variants of the quantized input image and the coding of the input symbols can be amended dynamically during the process sequence.

The pattern processing may be executed as a particularly efficient multi-stage process, whereby selected symbols of a first process stage serve as input patterns of a second process stage. The generation of a number n of discrete variants of the discretized input pattern in process step b) of the second process stage may be effected by mixing output symbols of the first stage.

Furthermore, in accordance with the invention an apparatus for pattern processing is proposed, exhibiting a discretizing device for discretizing an input pattern, a device for generating a number n of discrete variants of the quantized input pattern in accordance with established rules, a number n of input stages for generating, for each input-pattern variant, an assigned output symbol from a set of symbols, and a selection unit for selecting a symbol by way of selected symbol relating to the input pattern from the n generated output symbols in accordance with an established selection rule.

The input stages preferentially take the form of associative memories, for example hash tables or even ordinary random-access memories (RAM).

The input stages may each exhibit a pattern input, a reference-symbol input, an update-activation input and a symbol output.

The selection unit preferentially exhibits a number n of symbol inputs, a symbol output, an output for outputting a signal (majority) that specifies the number of times the selected symbol was entered into the selection device, and an output for outputting a signal (veto) that specifies a number of assignments of other symbols (votes against).

The selection unit may additionally exhibit a reference-symbol input and an update-activation input.

$n \geq 3$ (typically at least a hundred or more) memory units are combined with a voting procedure, whereby under certain conditions the result of the majority decision is fed back to the reference-symbol inputs of the memory units, resulting in completion of the learning procedure and consequently of the maps.

BRIEF DESCRIPTION OF THE DRAWING

The invention will be described in the following on the basis of exemplary embodiments with reference to the Figures, in which:

FIG. 6 shows a second example of the generation, in accordance with the invention, of a discrete variant of an input image;

FIG. 11 shows an image of a scanned page from a book demonstrating the phenomenon of hyperacuity.

FIG. 12 shows a portion of the image shown in FIG. 11, which has been converted to black and white by a simple threshold operation.

DETAILED DESCRIPTION OF THE INVENTION

Exemplary embodiments of the invention will be elucidated in the following on the basis of the appended Figures.

Figure 1:
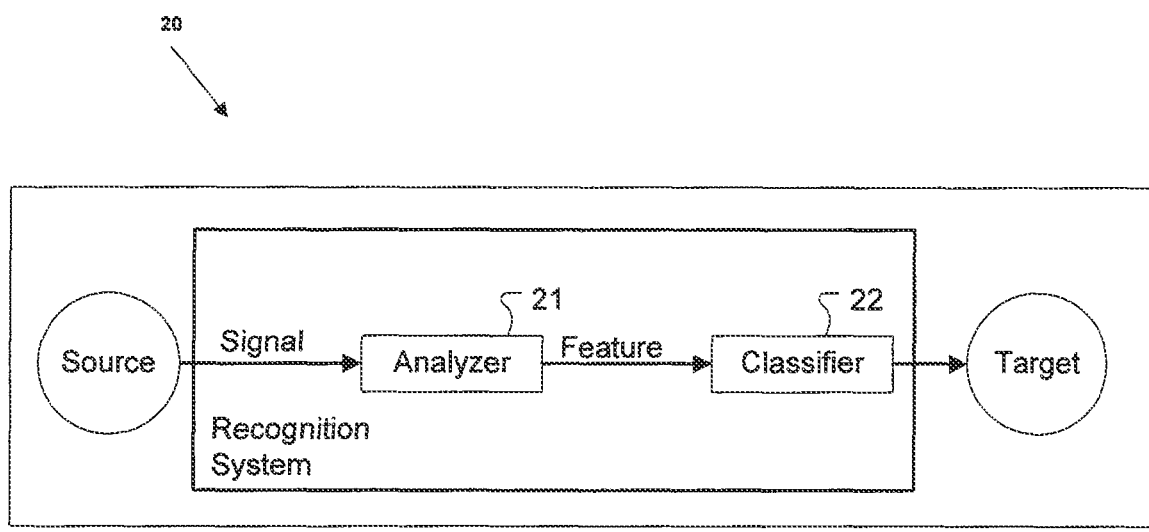
FIG. 1 illustrates schematically a known pattern-processing process.
Figure 2:
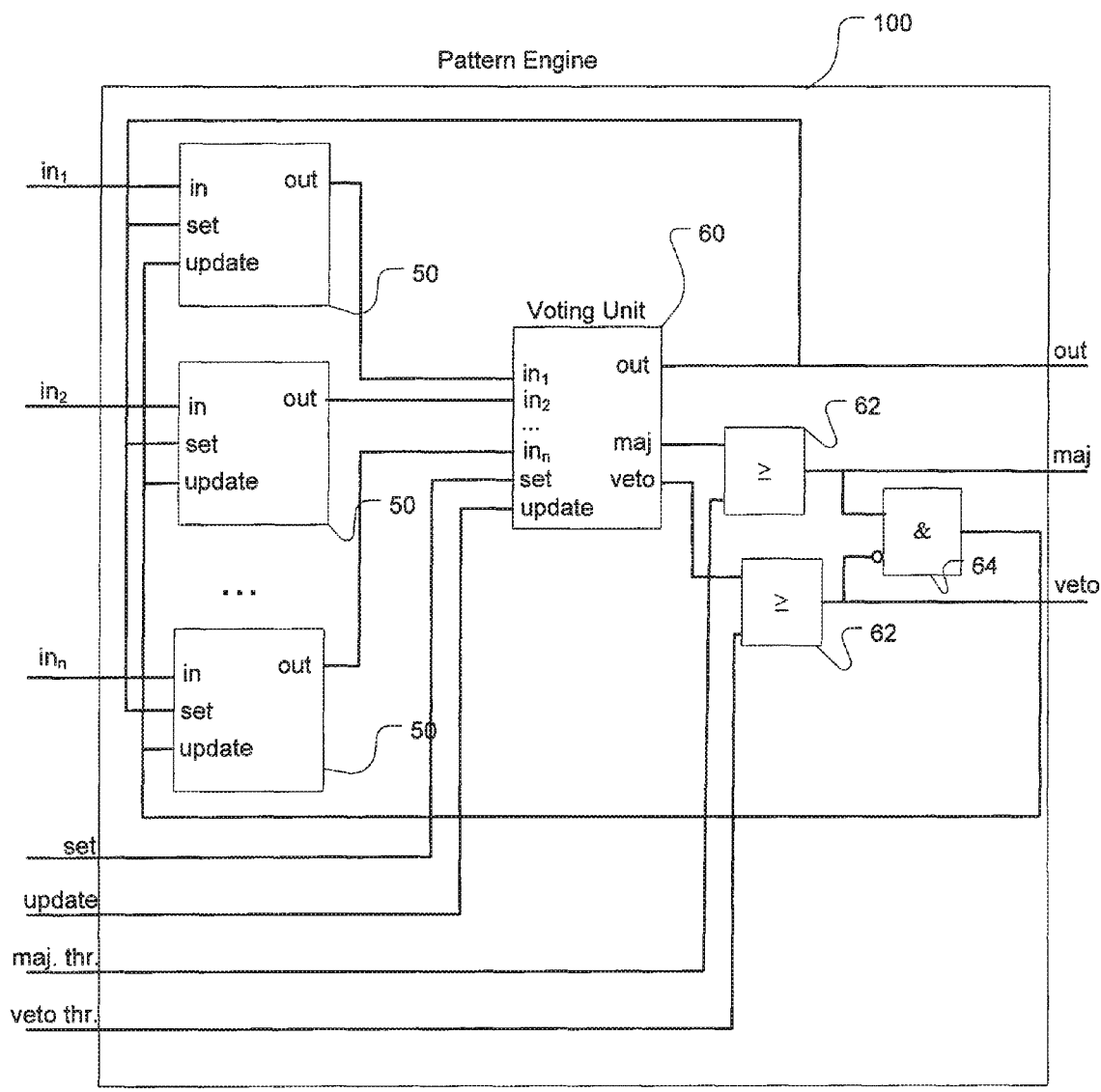
FIG. 2 shows schematically an exemplary embodiment of the pattern-processing apparatus according to the invention.

FIG. 2 shows schematically an exemplary embodiment of the pattern-processing apparatus 100 according to the invention. Said apparatus exhibits a plurality of (typically a few hundred) input stages 50, each connected to a signal input, the signal outputs of which are all connected to a selection/voting unit 60. The output of the selection unit 60 is in turn connected to two comparators 62 for comparison with input threshold values, and also to a logic gate 64. The functionality of the individual components of the circuit arrangement shown in FIG. 2 will be described in the following.

(1) The Input Stages

Figure 3:
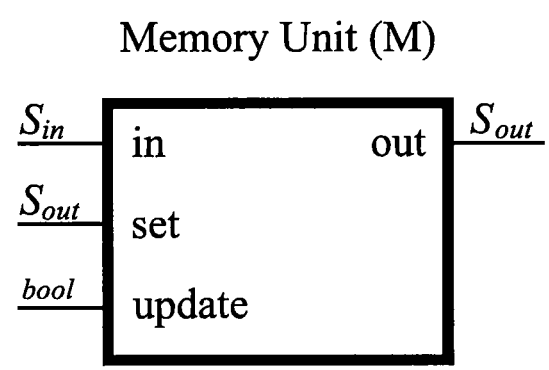
FIG. 3 shows schematically a memory unit of the pattern-processing apparatus represented in FIG. 2.

An exemplary embodiment of the input stage 50 is shown schematically in FIG. 3. Each input stage (memory unit) realises a mapping from one symbol domain $S_{in}$ to another symbol domain $S_{out}$ which can be changed by a update operation.

They may be realised as associative memories (hash tables, CAM) or as a quite ordinary RAM with n address inputs and in data outputs.

A symbol domain is a finite set of discrete symbols, extended by the special symbol ⊥ with the meaning "indeterminate".

Examples: associative memories (CAM, hash table)
$S_{in}$={red, orange, yellow, green, indigo, violet, ⊥}
$S_{out}$={good, poor, ⊥}
or (realisable by ordinary RAM)
$S_{in}$={0000=⊥, 0001, 0010, 0011, 0100, ..., 1111}
$S_{out}$={00=⊥, 01, 10, 11}

The behaviour of the exemplary embodiment of the input stage 50 can be summarised as follows (typical memory sizes up to 100 Megabits):

At first, M maps each input symbol to the symbol ⊥.
This state is also designated as "empty memory".
If UPDATE is set to false, nothing changes.
If UPDATE is set to true, the instantaneous value of SET appears at the output OUT.
If UPDATE goes back to false, the association between the value IN and the value OUT is stored.
The value ⊥ does not play any special role for OUT and SET, though a ⊥ at the input IN is always mapped to ⊥ at the output OUT.

In this connection the symbol sets do not have to have been established from the beginning. A new symbol which has never occurred before at IN is mapped to ⊥. New output symbols can be added via the SET input.

The symbol ⊥ permits the memory units to store functions with varying domains of definition.

(2) The Selection Unit

Figure 4:
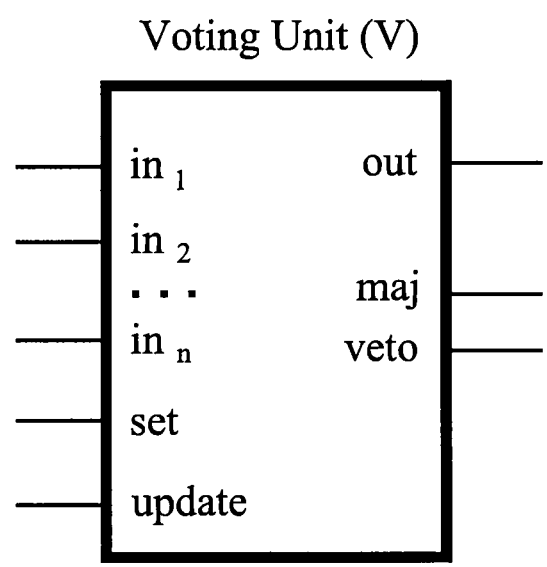
FIG. 4 shows schematically the selection/voting unit of the pattern-processing apparatus represented in FIG. 2.

An exemplary embodiment of the selection unit 60 is shown schematically in FIG. 4. The selection unit or voting unit 60 has n≧3 (typically a few hundred) symbol inputs, a symbol output OUT and two digital outputs, MAJORITY and VETO.

The output OUT supplies the symbol that is represented most frequently at the input, the indeterminate value ⊥ being ignored. The output is accordingly only ⊥ when all the inputs are ⊥.

In stalemate situations, any of the values entering into consideration can be supplied, or even ⊥.

The output MAJORITY supplies the number of votes of the majority symbol, and the output VETO supplies the number of the votes against. The value ⊥, as an abstention, is not counted.

TABLE 1

| 1 2 3 4 5 | OUT | MAJORITY | VETO |
|---|---|---|---|
| ⊥ ⊥ ⊥ ⊥ ⊥ | ⊥ | 0 | 0 |
| ⊥ a ⊥ ⊥ ⊥ | a | 1 | 0 |
| ⊥ a a ⊥ a | a | 3 | 0 |
| a a b c d | a | 2 | 3 |
| ⊥ a a b a | a | 3 | 1 |

The inputs SET and UPDATE serve for the input of reference examples.

(3) The Pattern-Processing Apparatus

The pattern-processing apparatus 100 (pattern engine, PE) represented in FIG. 2 consists of n input stages 50, a selection unit 60, two comparators 62 and a logic gate 64.

The number of inputs can be amended dynamically; it does not have to be established from the start. A new input stage 50 can be added at any time. Conversely, an individual input stage 50 can be removed without substantially impairing the overall system.

If UPDATE is set to true, the input SET is passed to OUT. The outputs MAJORITY and VETO are forced to n and 0, respectively. Hence the value at SET is then also written back into the memory units.

The term VETO relates, first of all, to the output of the selection unit 60. The veto of an individual input stage 50 means that the output of the input stage differs from the MAJORITY output (=SET input).

(4) Use of the Pattern-Processing Apparatus for the Purpose of Pattern Recognition Preparatory steps known to a person skilled in the art—such as, for instance, the removal of the d.c. portion with a high-pass filter, or a contrast control (standard processes of image processing)—will not be considered further here. Furthermore, the segmentation problem will not be dealt with here. It will be assumed that the images have already been resolved into rectangles (bounding box, bbox) which each contain only one symbol.

Figure 5:
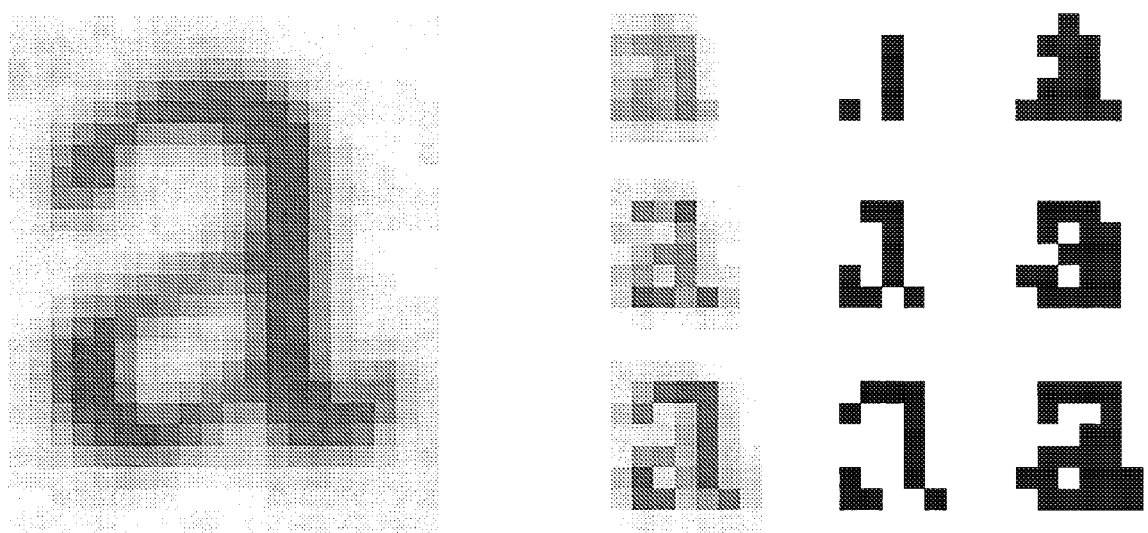
FIG. 5 shows a first example of the generation, in accordance with the invention, of a discrete variant of an input image.
Figure 7:
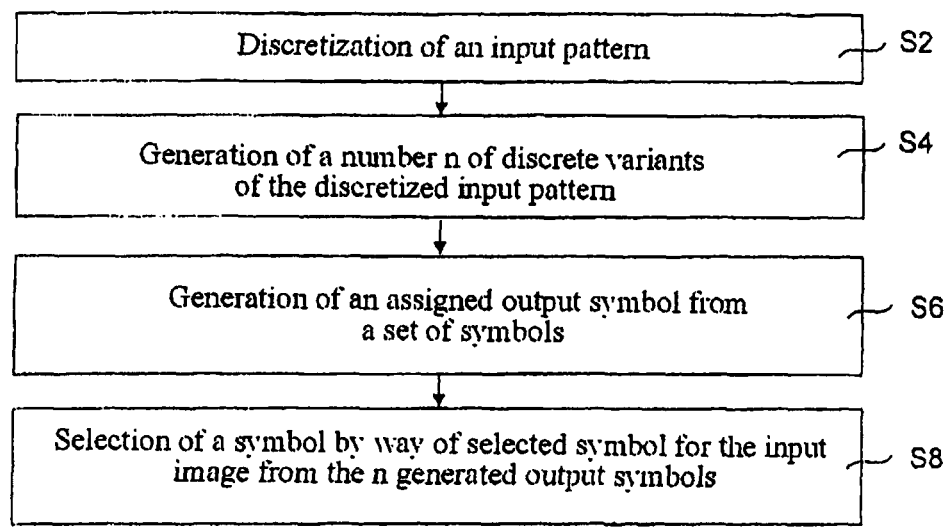
FIG. 7 shows, on the basis of a flow chart, the process steps of an exemplary embodiment of the pattern-processing process according to the invention.

The input data are small rectangular grey-scale images, as represented to some extent in FIGS. 5 and 6, on the left. The set of all grey-scale images—with, for example, 256 grey values and, for example, 38×44 pixels—is already no longer continuous but forms a discrete space in which equality and inequality can easily be established. This property is, however, of little advantage, since two exactly identical images will never be produced. This variability of the input data has many causes:

The orientation of the entire page may vary (affine transformation).
A pincushion distortion is an example of a more general distortion.
The lighting is uneven.
The paper is wavy and has stains.
The precise position and size of the box cannot be established exactly, and neither can the position of the symbol within the box.
In the case of low (not too low) resolution of the sensor, aliasing effects arise.
The printing types are worn to varying degrees; hair-lines may have been broken off.
The set of black inks fluctuates; the opening in an 'e' may have been smeared.

Within a font family there are more or less pronounced differences of detail.

TABLE 2

| Step | N | Commentary |
|---|---|---|
| 0 | 1 | output image |
| 1 | 5 | slight displacements |
| 2 | 25 | rotations by −2, −1, 0, 1, 2 degrees |
| 3 | 50 | scalings to 7 × 8 and 8 × 7 pixels |
| 4 | 100 | threshold-value operations with various threshold values |

Instead of, as in the state of the art, reducing this variability by normalisation, it is even increased by the following exemplary sequence (Table 2). Onto the image of a symbol the transformations listed in Table 2 are applied in succession, which from the one output image generate an increasing number of variants of the input image.

If two bit patterns differ in at least one bit, they are different, and it does not matter whether it is only a single different bit or 40 different bits. Therefore hashing techniques present themselves for the purpose of realising the input stages.

Real-Time Learning:

What now happens if the camera image of the input pattern is displaced slightly?

If the displacement remains very small, about 1/100 mm, none of the bitmaps changes, and the output symbol 'G' remains stable with 100.0% majority.

If the displacement increases, some bitmap will be first to change its state; the output state of the assigned input stage changes to ⊥. At this moment the update output becomes active and the majority is increased again to 100.0%.

But if a single one (or a few, VETO_THRESHOLD) of the bitmaps is assigned to another symbol, the majority cannot be increased. In this manner a symbol is prevented from spreading in unlimited manner in the memory units.

Offline Learning:

After the input of, for example, 10 reference patterns for each output symbol, hundreds of thousands of symbol boxes of numerous pages of text are presented in succession to the input quantizers. Many of them are already recognised correctly, despite very small majorities.

In some, MAJORITY_THRESHOLD is exceeded, without a veto being present, and the number of entries in the memory units increases.

Upon a renewed pass, the threshold is then also exceeded at places that remained below the threshold on the first pass.

After a few steps, frequent symbols are recognised with 99% majorities. If the procedure begins to falter or errors occur, assistance can be given via the SET input.

The scaling operation forms the value of a pixel as the mean value of adjacent pixels. This can also be described as a linear mapping.

Figure 8:
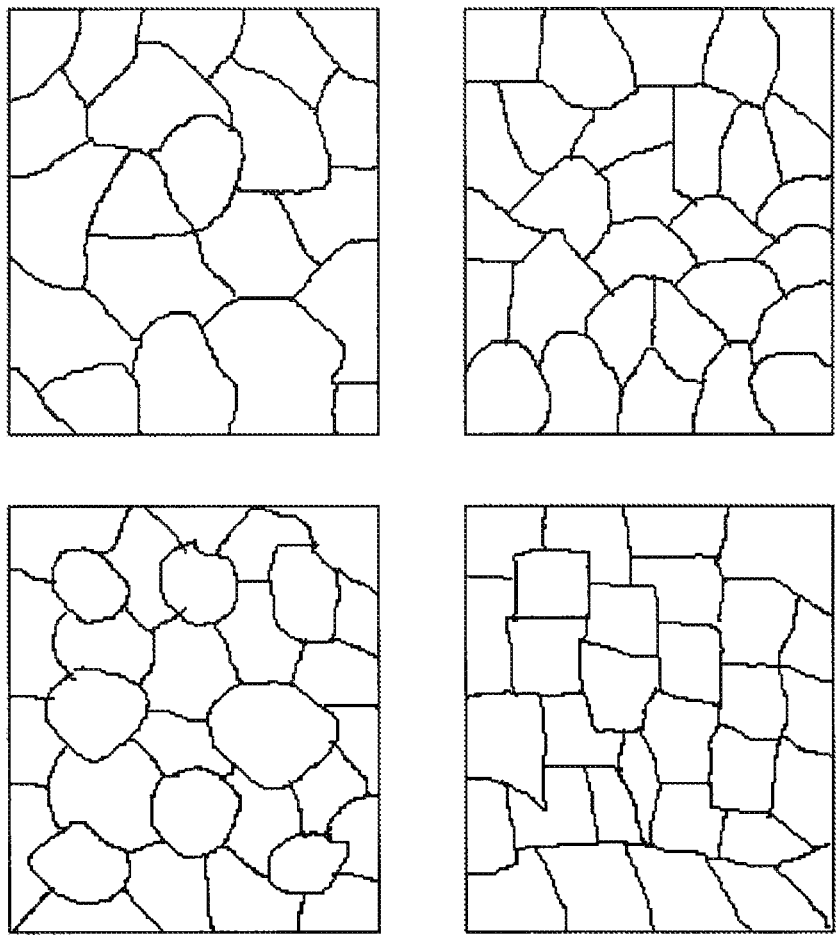
FIG. 8 illustrates schematically the mapping of an input-image space onto a number of output symbols.

The displacements and rotations are likewise linear operators, so that the 50 mappings that convert the input image from step 0 into the 50 images of step 3 are all linear mappings from R38x44 to R56, which can be easily distinguished. But the restriction to linear mappings is not relevant. The question of which mappings are used is immaterial, within wide limits. Interesting are, for example, averagings over irregularly shaped receptive fields that cover the input image. Diversity then arises by virtue of the fact that these partitionings can be performed in many different ways (FIG. 8).

All that is important is that the input space is mapped with a whole host of different mappings into relatively small, discrete image spaces (address spaces), and that these mappings are locally constant.

By composing of compatible mappings, the pattern engine then forms a new mapping which is locally constant on larger regions.

Therein also lies the key to the recursive structure, described further below, of a hierarchical network of pattern engines. The higher levels use combinations of the output symbols of the lower levels as input symbols.

The domains of constancy get larger and larger. On higher levels of a hierarchical network of pattern engines common transformations of input patterns become irrelevant.

The combination of linear mapping and threshold-value operation can also be generalised in the following direction:

Let $v \in R''$ be a feature vector, let $w \in R''$ be normalised, and let $b \in R''$ be permanently chosen.

That is $f(v)=(1$ if $<v-b,w> \geqq 0$, and 0 otherwise) a crude classifier which only specifies on which side of the hyp/plane $\{x \in R''| <x-b,w>=0\}$ the point v lies.

With 20 permanently chosen hyperplanes a locally constant mapping to $\{0,1\}20$ is obtained.

Many different mappings of this type again form a suitable input wiring of the pattern engine.

The input stages 50 are constituted by a plurality of different discretization mappings (quantizers).

If a reference pattern is applied at the input, numerous different symbols appear at the inputs $in_1, in_2, \ldots, in_n$. Via the inputs (SET, UPDATE) an output symbol ('a') is assigned. If UPDATE goes back to false, the output remains stable with a 100% majority.

Further reference patterns for the diverse symbols that are to appear at the output can now be presented in succession.

Now if the input symbols do not all change at the same time one of the outputs of the input stages 50, for instance $OUT_4$, first goes to ⊥. In this situation the UPDATE output becomes active, and an 'a' is written back to all the input stages 50, which makes a difference only for the fourth input stage $50_4$. In this manner, the map of the outside world, which is coded in the input stages, grows; a learning procedure takes place.

If the vicinity of another symbol is reached, at some time or other another symbol emerges at one of the $OUT_k$. This point is not an inner point of the "set of all 'a'" but rather a boundary point. The VETO output prevents any updating in this case.

Typical values for MAJORITY_THRESHOLD and VETO_THRESHOLD are, for instance, n/2 and 0.

Plausibility:

If MAJORITY attains the value n/2, the majority decision can no longer tip by virtue of further entries in the memory units.

A single veto indicates the vicinity of the boundary.

This does not mean that the ⊥ gaps in the input stages would not be filled up at all and the majority cannot be improved; it will just happen only on other paths—in the case of other input patterns. In high-dimensional spaces the relationship (cohesion) is strong; there are many paths from one point to another.

MAJORITY_THRESHOLD and VETO_THRESHOLD can also be made dependent on the frequencies of the symbols in the memory units. Rare symbols would then find it easier to spread.

The interaction between majority rule and veto rule can also be interpreted as a minimisation of the increase in entropy. To the frequency distribution of the symbols at the input of the selection unit their Shannon entropy $(-\Sigma p_i \log p_i)$ can be assigned. A unanimous result has entropy 0; a single vote against makes the entropy become positive.

However, because the indeterminate symbol ⊥ may also occur, the entropy is not known exactly.

But if 99 out of a hundred inputs show an 'a' and one input is unknown, the entropy may lie only between 0 and 0.0808 bit, and the value 0 is much more likely.

If, on the other hand, only 30% 'a' are present and the rest are unknown, the entropy may lie between 0 (everything 'a') and 5.17 bits. The latter case would obtain if all 70 missing outputs were to show 70 different symbols. For 70% 'a' and 30% 'b' the entropy would be 0.88 bit.

Veto rule and majority rule ensure that the UPDATE output is only activated when the increase in entropy to be expected is zero with high probability or is at least very small.

The juxtaposition of the memory units may also be replaced by a temporal succession (for example, for the purpose of speech recognition):

In the sequence a a a a a a a a a a a a a ⊥ a a a a a a a a the gap can be filled.

In the sequence a a a a a a a a a b a a ⊥ a a a a a a a a this is prevented by a veto.

But majority and veto can then be acquired very simply by a comparison of consecutive symbols and by temporal integration of the output signal, whereby the veto results in the resetting of the integrator. If the integrated MAJORITY signal exceeds a threshold, the value 'a' is written back into the input stage. The plurality of the juxtaposed discretization mappings is then replaced by temporally variable mappings. Everything else remains the same.

TABLE 3

| | Comparator | | |
|---|---|---|---|
| $IN_k$ | $IN_{k+1}$ | MAJORITY | VETO |
| ⊥ | ⊥ | 0 | 0 |
| a | ⊥ | 1 | 0 |
| a | a | 2 | 0 |
| a | b | 0 | 1 |

Or, still more simply:

TABLE 4

| | Comparator | |
|---|---|---|
| $IN_k$ | $IN_{k+1}$ | OUT |
| ⊥ | ⊥ | 0.0 |
| a | ⊥ | 0.3 |
| a | a | 1.0 |
| a | b | -8.0 |

If the integrated OUT signal exceeds the threshold 0.5, the UPDATE input is activated. The large negative value −8.0 will reset the integrator.

(5) Example

Application to the OCR Problem

On the input side, images with (for example) 20×20 pixels and 256 scales of grey are presented. The use of $2^{400*256}$ symbols is, of course, impossible. Instead of this, averaging and threshold-value operators are combined, in order to acquire many small bitmaps from the input image. The value of a pixel in the scaled image is a mean value of adjacent pixels of the input image.

FIG. 5 shows 5×6, 6×7, 7×8 grey scales of the input image "a" (on the left) with various threshold-value operations.

FIG. 6 shows a 5×6 scaling of the input image "a" (on the left) with fixed threshold value and rotation of the original image by +/−1°.

The problem of the correct choice of the threshold value does not arise, because several images which may result upon variation of the threshold value are formed anyway into one input image. Instead of a threshold-value comparison, a plurality of comparators may also be connected between the outputs of the mean-value calculations, as described in the audio example.

In addition, instead of the scaling operations, averagings over irregularly shaped "receptive fields" may be used. Cruder partitionings then correspond to a greater diminution. Here too it is important that several threshold values and more than one partitioning into receptive fields are used in parallel. The scaling operations, however, permit an intuitive interpretation of the symbols as bitmaps.

Most pattern recognition algorithms try to reduce variability up front, in order to simplify the task of recognition. In contrast, the method of the present invention is driven by variations. The topological structure of the input space X is reflected in these variations. The process according to the invention "thrives" on diversity at the input.

Starting from a few reference examples, the memory units are quickly filled up; in a 5×6 grid there are only a few thousand good a-patterns. The separation of 'b' and 'h', on the other hand, is more difficult with this resolution. At least in the case of some threshold values there are overlaps which, by way of veto, prevent the memory units from being filled up. The frequent veto indicates that too little information is present for the purpose of separating 'b' from 'h'. The number of 'b' entries and the number of 'h' entries remains small.

The simplest remedy consists in setting the disputed memory locations permanently to ⊥. They then accept no new symbols. Since the veto is dispensed with, there is the chance that filling up with good patterns takes place nonetheless.

Interesting is the following categorial property of the input wiring:

The images of the projection maps of X into the discrete spaces $X_i$ are small, e.g. they are sets of finite, low cardinality and the classifier f: X→Y can be factored at least approximately over $X_i$

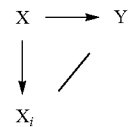

Since the $X_i$ are small, it is possible to make do with small memory units. After some time, no new patterns (patterns mapped to ⊥) arise ("factorised over X" means that not too much information is lost and the class of the original image mostly still remains recognisable from its image in $X_i$). The parallel connection of various projections has the effect that occasional collisions are without consequences.

But whether this condition is satisfied can be inferred very simply from the behaviour of the PE:

If an $X_i$ is too large, the number of symbols stored in M grows too considerably; the UPDATE output is almost always active if something changes at the input.

If an $X_i$ is too small, symbols are often overwritten, or the extension is blocked by frequent vetos—i.e. the output of $M_i$ often differs from the majority decision.

Too small $X_i$ are then increased by formation of a Cartesian product with an $X_j$; the number of memory units declines.

For $S_{in}=\{0000=\perp, 0001, 0010, 0011, 0100, \ldots, 1111\}$ this is simply the juxtaposition of the bit patterns. Merely the symbol $\perp$ requires a special treatment: if one of the components is equal to $\perp$, the resulting symbol should also be equal to $\perp$.

Too large $X_i$ are partitioned by projections onto two or more smaller spaces; the number of memory units increases.

For $S_{in}=\{0000=\perp, 0001, 0010, 0011, 0100, \ldots, 1111\}$ this is, for example, a partitioning of the bits into subsets.

Here too, the symbol $\perp$ requires a special treatment: it should be mapped to $\perp$. Conversely, $\perp$ should not appear by way of image if the original image was different from $\perp$.

As the experiment shows, the details do not matter quite so much.

If a few random (!) projections are placed downstream of the formation of a product, it also works. What cannot be distinguished in one projection remains separate in another, Such random projections are obtained, for example, by application of a hash function that mixes well, followed by bit maskings.

For a permanently chosen space $X_i$, many symbols can be separated well, others poorly. Example: in the case of a 6×5 scaling with fixed threshold value the 'a' is very characteristic, whereas 'b' and 'h' are difficult to separate. If bits are simply added to the input space, the memory requirement is increased unnecessarily, even though only the output symbol b/h is affected. The use of random projections after the formation of a product prevents the boundless increase in the memory requirement.

In the OCR example, partitionings of the image into tiles, for example, or bit maskings in the bitmaps, are suitable projection mappings. Conversely, the combining of pixels to form a 4×4 image is an injective mapping into the Cartesian product of the individual-pixel spaces. The quantizers at the input are also only special cases of this construction.

TABLE 5

| Product formation | |
|---|---|
| in1 | out |
| in2 | |
| in3 | |
| Projection | |
| in | out |
| Mixer | |
| in1 | out1 |
| in2 | out2 |
| | out3 |
| | out4 |

Formation of a product and projections can be brought about by a switching element in which these two operations are not clearly separated. This element may be designated as a symbol mixer (in Table 5 a 2:4 mixer). It maps an element of the product of n small spaces into an element of the product of m other small spaces.

A delay of the input symbol may also be provided. It then appears at the output after a delay-time. The delay does not have to be the same for all switching elements; this also increases the diversity and alleviates the composing of the maps. The inclusion of delay elements enables the learning of time-dependent patterns.

TABLE 6

| Delay | |
|---|---|
| in | out |
| delay = 20 ms | |

The function of such a switching element, represented schematically in Table 6, can be assumed by the input stages themselves if a finite response-time is ascribed to them.

(6) Example

Application to Speech Recognition

The input audio signal is conveyed to a filter bank consisting of 24 (16 to 32) second-order band-pass filters. But the deflection serves not as output signal but rather as a measure of the energy stored in the filter—a quadratic form in the two state variables
($E_{kin}+E_{pot}$ in the case of a mass/spring system)

From this, projections into spaces of the size 8 to 32 bits can be acquired with numerous comparators which are switched between, in each case, two outputs. Downstream of (or even upstream of, 1-bit signals) the projection elements, delay elements can be inserted in diverse manner. They then permit the recognition of frequency-dependent and time-dependent patterns.

Overall in this way the requisite diversity is obtained at the output of the pattern-processing apparatus.

(7) Complex Networks

The application to typeface recognition can make do with a single pattern-processing apparatus (pattern engine). Said apparatus maps the input patterns—after suitable choice of the $X_i$, i.e. after choice of the discretization mappings—directly onto the desired symbol. But the recognition performance cannot be increased arbitrarily. For this purpose the structure of a network of pattern engines is necessary. This multi-stage network is designated as a 'system'.

Figure 9:
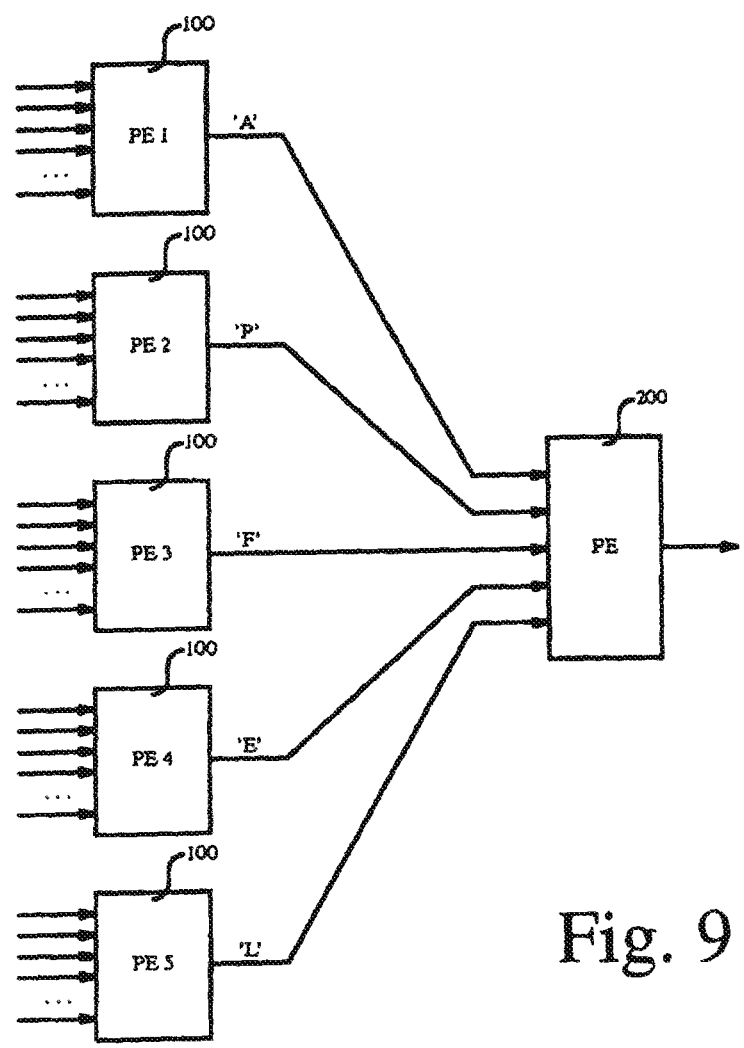
FIG. 9 shows schematically an exemplary embodiment of a two-stage pattern-processing apparatus according to the invention.
Figure 10:
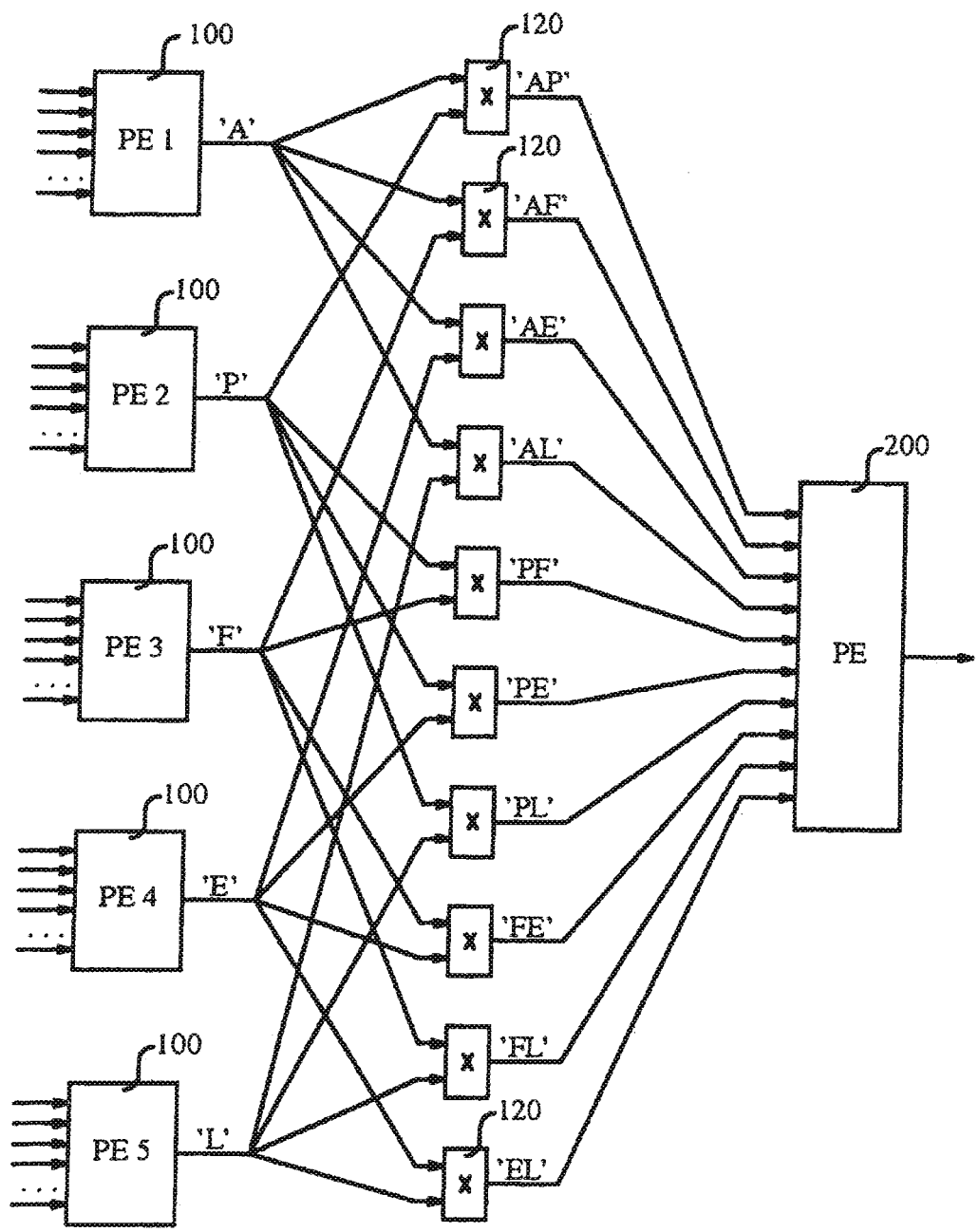
FIG. 10 shows schematically a further exemplary embodiment of a two-stage pattern-processing apparatus according to the invention.

FIG. 9 shows schematically a first—and FIG. 10 a second—exemplary embodiment of a two-stage pattern-processing apparatus according to the invention. The symbol outputs of the pattern-processing apparatuses of the first stage (100) are connected to the pattern inputs of the pattern-processing apparatus of the second stage (200) either directly (FIG. 9) or—for the purpose of enabling a greater diversity of the input-pattern variants—via mixers (120).

Special properties of the pattern engine which, in particular, are of advantage in the case of two-stage or multi-stage pattern-processing apparatuses are:

1. The types of IN, OUT and SET are symbols. Since the symbol sets do not have to be rigidly established, PEs can be interconnected in a variety of ways. The interconnection can be changed dynamically.
2. The number of inputs can be amended dynamically; a new memory unit begins immediately to fill with useful information (learning procedure). The omission of a memory unit does not make the system inoperative.
3. The coding of the input symbols can be amended dynamically.
   Example:
   One of the bitmap inputs is inverted (black↔white). The entries in the memory unit are then completely useless.

Said memory unit can be emptied; everything is again mapped to ⊥. The learning procedure quickly fills the unit up again.

4. The partitioning of an input-symbol set by projections leaves the system operational. One input stage drops out, which is replaced by two new, empty input stages. The learning procedure quickly fills both up again.
5. If in points 3, 4 the transformation is known explicitly, the content of the input stage can also be converted into the new coding. This proceeds more quickly, but not necessarily better.
6. Points 2, 3, 4 permit the size of the spaces $X_i$ to be adapted dynamically. If an input stage continually gives rise to VETOs, the input space is too small or the output space is too large.
7. Feedbacks from hierarchically subordinate layers (Jeff Hawkins: "On Intelligence") to superordinate layers can be added at any time. However, connecting a signal that has been fed back simply to one of the inputs of the pattern engine is not meaningful. The majority decision will barely change as a result. It is more meaningful to mix many of (all) the input signals with the signal that has been fed back. Properties 2, 3, 4 ensure that this procedure can be effected in stepwise manner, beginning with an input. At the end, all the inputs are provided with mixers, and the system has then learned to take account of the signal that has been fed back (an expectation). However, because the mixers also bring about a type of encryption, reverse engineering is made difficult.
8. Just as in the case of 7, signals can skip a layer in the forward direction.
9. Points 7 and 8 have the result that the separation of the hierarchical stages becomes indistinct. Reverse engineering is made difficult.
10. The symbols that have been fed back may be delayed (delay module). After the integration of the mixers (7), the system then responds to known space-time patterns.
11. If the delay is too short, it yields no new information. As in the case of (3), the delay can be changed dynamically; the entries in the memory units adapt themselves.
12. As in the case of point 7, symbols can also be processed that have arisen from the processing of quite different input stages, which, for instance, are assigned to position sensors or to specific, motorised purposes.
13. If the PEs following the input stage work too well, possibly too little diversity appears at the inputs of the subordinate PEs, the learning process does not get going. The diversity at the input can then be increased, for instance by slight blurring/distortion of the input image (eye movements, saccades, movements generally) or even quantization noise.
14. In higher hierarchical stages, periodic processes (brain waves) and random patterns could assume this role. The feed of random symbols also improves the sequence of the operations described under points 2 to 7.
15. In the OCR example the symbols were predetermined explicitly. The symbols in the intermediate layer of a two-stage system (visual area V1+a further layer) may be, for example, symbols for graphic morphemes, such as straight, rounded, angular, pointed, in combination with orientation information such as vertical, horizontal, left, right.
16. The symbols of the intermediate layer may also come about as follows: when feeding in the exemplary patterns the desired output symbol is applied to all the set inputs of all the PEs. In the second layer the input symbol is firstly ⊥, so that nothing is stored. As soon as the outputs of the first layer stabilise, the desired symbol is also stored in the second layer. But since the input spaces of the first layer are too small, conflicts appear, either already when applying the reference patterns or at the latest in the case of variation of the input patterns, which block the extension in the first layer (and indirectly also in the second layer). Instead of, as in the case of 6, now modifying the input space, the distinction between the reference symbols in this input stage can also be abandoned (diminution of the output space). The majority improves; the veto disappears. In the second layer and in the other input stages nothing happens. (Example: very similar letters that differ only in a local detail). This goes beyond the temporary ignoring of the veto for these two symbols. The technical realisation could be an attack-decay filter which lowers the weighting of prolonged vetoes.
17. Alternatively, the symbols of the intermediate layer can be generated by applying a random symbol at the 'set' input of the pattern amplifier and by occasional impulses at the UPDATE input. Then too, the learning procedure gets going. Later the application of points 3 to 7 results in the eradication of irrelevant symbols.

Summing up, the subject-matter of the present invention is the construction of a pattern-processing/pattern-recognising machine that compiles ever more complete maps of the outside world from a diversity of time-dependent, symbolic input signals. In their totality these maps bring about a rapid, reliable and robust pattern processing, i.e. a mapping onto an output symbol.

n (n≧3, typically a hundred) input stages are combined with a voting procedure, the result of a majority decision being fed back, under certain conditions, to the set inputs of the input stages, resulting in the completion of the maps.

The process according to the invention for pattern processing and pattern processing can recognise patterns in real time, with very high accuracy, and with very little computation effort. In its performance this method clearly surpasses the hidden Markov models (HMMs) which previously have been the state of the art for the purpose of pattern processing.

The process can, moreover, solve problems of VLR-OCR (very low-resolution OCR, also HMMs) very well in connection with recognition of really very small typefaces.

The invention claimed is:

1. Process for pattern processing, exhibiting the following steps:
    a) discretizing of an input pattern,
    b) generation of a number n of discrete variants of the discretized input pattern in accordance with established rules,
    c) input of each of the n discrete input-pattern variants into a memory element and, in each memory element, mapping of the entered input-pattern variant to a respectively assigned output symbol from a finite set of discrete symbols in accordance with an associative assignment rule, and
    d) selection of one of the output symbols by way of selected symbol relating to the input pattern from n generated output symbols in accordance with an established selection rule, wherein the associative assignment rule in step c) is learned by feedback of the selected symbol as a reference symbol at a symbol input (set) of the memory element; in which
    the pattern processing is executed as a multi-stage process, wherein selected symbols of a first process stage serve as input patterns of a second process stage, and in which the generation of a number n of discrete variants of the discretized input pattern in process step b) of the second process stage is effected by mixing output symbols of the first stage.

2. Process according to claim 1, wherein the input pattern is a spatially variable input image.

3. Process according to claim 2, wherein the discrete variants of the discretized input pattern in process step b) are generated in each instance by one or more image-processing operations selected from the group consisting of displacements, rotations, scalings and threshold-value operations on the input pattern.

4. Process according to claim 1, wherein the input pattern is a temporally variable input signal.

5. Process according to claim 1, wherein the finite set of discrete symbols in process step c) includes a symbol with the meaning "indeterminate".

6. Process according to claim 1, wherein the established selection rule in process step d) includes a majority decision.

7. Process according to claim 6, wherein in a case of the majority decision, a simple majority of the symbols suffices for determining the selected symbol.

8. Process according to claim 6, wherein in a case of the majority decision a number of other assigned symbols (votes against) are registered.

9. Process according to claim 1, wherein the number n of discrete input-pattern variants is amended dynamically.

10. Process according to claim 1, wherein the number n of discrete variants of the discretized input pattern is amended during the process.

11. Apparatus for pattern processing, exhibiting:
a discretizing device for discretizing an input pattern;
a device for generating a number n of discrete variants of the quantized input pattern in accordance with established rules;
a number n of memory elements which have been set up to map each of the n discrete input-pattern variants onto a respectively assigned output symbol from a finite set of discrete symbols in accordance with an associative assignment rule; and
a selection unit for selecting one of the output symbols by way of selected symbol relating to the input pattern from n generated output symbols in accordance with an established selection rule;
wherein the memory elements and the selection unit are connected to one another in such a way that the associative assignment rule which is used in at least one of the connected memory elements is learned by feedback of the selected symbol as a reference symbol at a symbol input (set) of the connected memory elements; and
wherein the memory elements each exhibit a pattern input, a reference-symbol input, an update-activation input and a symbol output.

12. Apparatus according to claim 11, wherein the memory elements take the form of associative memories.

13. Apparatus according to claim 11, wherein the selection unit exhibits a number n of symbol inputs, a symbol output, an output for outputting a signal (majority) that specifies a number of the selected symbol and an output for outputting a signal (veto) that specifies a number of other input symbols.

14. Apparatus according to claim 13, wherein the selection unit additionally exhibits a reference-symbol input and an update-activation input.

15. Apparatus according to claim 11, which takes a form of a multi-stage pattern-processing apparatus, wherein selected symbols of a first processing stage serve as input patterns of a second processing stage.

16. Apparatus according to claim 15, wherein mixers are provided for mixing output symbols.

17. Computer program embodied on a non-transitory computer-readable medium, which, when running on a computer system, executes the process according to claim 1.

18. Non-transitory computer-readable medium, on which the computer program according to claim 17 is stored.

* * * * *

UNITED STATES PATENT AND TRADEMARK OFFICE
CERTIFICATE OF CORRECTION

PATENT NO.        : 8,463,042 B2
APPLICATION NO.   : 12/471047
DATED             : June 11, 2013
INVENTOR(S)       : Eberhard Falk Page 1 of 1

It is certified that error appears in the above-identified patent and that said Letters Patent is hereby corrected as shown below:

In the Specification

On column 5, line 17 the word "in" should read --m--.

Signed and Sealed this
Twenty-fourth Day of September, 2013

Teresa Stanek Rea
*Deputy Director of the United States Patent and Trademark Office*